US008833355B2

(12) United States Patent
Paulson

(10) Patent No.: US 8,833,355 B2
(45) Date of Patent: Sep. 16, 2014

(54) PNEUMATIC TIRE FOR THROWING MACHINE

(75) Inventor: Kerry K. Paulson, Tualatin, OR (US)

(73) Assignee: Jugs Sports, Inc., Tualatin, OR (US)

( * ) Notice: Subject to any disclaimer, the term of this patent is extended or adjusted under 35 U.S.C. 154(b) by 600 days.

(21) Appl. No.: 13/155,258

(22) Filed: Jun. 7, 2011

(65) Prior Publication Data
US 2012/0312290 A1 Dec. 13, 2012

(51) Int. Cl.
A63B 69/40 (2006.01)
F41B 4/00 (2006.01)
B60C 15/00 (2006.01)
B60C 11/00 (2006.01)
B60C 9/06 (2006.01)
B60C 5/01 (2006.01)
A63B 69/00 (2006.01)

(52) U.S. Cl.
CPC ............... B60C 5/01 (2013.01); B60C 15/0018 (2013.01); B60C 11/0083 (2013.01); A63B 2069/0008 (2013.01); A63B 69/406 (2013.01); A63B 2069/402 (2013.01); B60C 9/06 (2013.01); A63B 69/0002 (2013.01)
USPC ........ 124/78; 124/1; 124/6; 124/82; 473/451; 152/546

(58) Field of Classification Search
CPC ..................... A63B 69/406; A63B 2069/0008; A63B 2069/402
USPC ................ 124/1, 6, 78, 82; 473/451; 152/546
See application file for complete search history.

(56) References Cited

U.S. PATENT DOCUMENTS

| 1,611,814 | A |   | 12/1926 | Butler |
|---|---|---|---|---|
| 2,994,313 | A |   | 8/1961 | Grahn |
| 3,399,660 | A |   | 9/1968 | Swartout |
| 3,538,900 | A |   | 11/1970 | Samuels |
| 3,602,208 | A |   | 8/1971 | Huerlimann |
| 3,604,409 | A | * | 9/1971 | Doeg ............................. 124/78 |
| 3,724,437 | A | * | 4/1973 | Halstead ........................ 124/78 |
| 3,774,584 | A |   | 11/1973 | Paulson |
| 3,777,732 | A |   | 12/1973 | Holloway et al. |
| 3,811,421 | A | * | 5/1974 | Betten ............................. 124/78 |
| RE28,462 | E | * | 7/1975 | Halstead ........................ 124/78 |
| 3,913,552 | A |   | 10/1975 | Yarur et al. |
| 4,025,071 | A | * | 5/1977 | Hodges ........................ 473/436 |
| 4,026,261 | A | * | 5/1977 | Paulson et al. .................. 124/78 |
| 4,080,950 | A |   | 3/1978 | Paulson et al. |
| 4,086,903 | A |   | 5/1978 | Scott |

(Continued)

FOREIGN PATENT DOCUMENTS

| CN | 201244336 | 5/2009 |
|---|---|---|
| FR | 859925 | 1/1941 |
| JP | S57-53584 | 11/1982 |

OTHER PUBLICATIONS

Trend Sports, Inc. catalog. pp. 13-14 (Crusher Mini Lite-Ball Pitching Machine and accessories), 2006.

(Continued)

Primary Examiner — Gene Kim
Assistant Examiner — Alexander Niconovich
(74) Attorney, Agent, or Firm — Schwabe, Williamson & Wyatt, P.C.

(57) ABSTRACT

Embodiments of systems, apparatuses, articles, methods, and tires for throwing machines are generally described herein. Other embodiments may be described and claimed.

17 Claims, 3 Drawing Sheets

(56) References Cited

U.S. PATENT DOCUMENTS

| | | | |
|---|---|---|---|
| 4,193,591 A * | 3/1980 | Paulson | 124/78 |
| 4,197,827 A * | 4/1980 | Smith | 124/78 |
| RE30,703 E | 8/1981 | Paulson et al. | |
| 4,372,284 A * | 2/1983 | Shannon et al. | 124/78 |
| 4,423,717 A * | 1/1984 | Kahelin | 124/78 |
| 4,442,823 A * | 4/1984 | Floyd et al. | 124/78 |
| 4,531,504 A * | 7/1985 | Gilreath | 124/78 |
| 4,561,414 A | 12/1985 | Nozato | |
| 4,632,088 A | 12/1986 | Bruce | |
| 4,655,190 A * | 4/1987 | Harris | 124/78 |
| 4,705,014 A * | 11/1987 | Kahelin | 124/1 |
| 4,760,835 A | 8/1988 | Paulson et al. | |
| 4,823,763 A | 4/1989 | Ponza | |
| 4,834,060 A * | 5/1989 | Greene | 124/78 |
| 4,883,272 A | 11/1989 | Lay | |
| 4,922,885 A * | 5/1990 | Iwabuchi et al. | 124/78 |
| 5,044,350 A * | 9/1991 | Iwabuchi et al. | 124/51.1 |
| 5,046,476 A | 9/1991 | Nozato | |
| 5,107,820 A | 4/1992 | Salansky | |
| 5,125,653 A | 6/1992 | Kovacs et al. | |
| 5,127,390 A * | 7/1992 | Paulson | 124/80 |
| 5,359,986 A * | 11/1994 | Magrath et al. | 124/78 |
| 5,396,876 A * | 3/1995 | Liscio et al. | 124/6 |
| 5,421,313 A | 6/1995 | Strayer | |
| 5,427,381 A | 6/1995 | Macaluso et al. | |
| 5,437,261 A | 8/1995 | Paulson et al. | |
| 5,464,208 A * | 11/1995 | Pierce | 473/451 |
| 5,505,510 A | 4/1996 | Duncan | |
| 5,569,094 A | 10/1996 | Macaluso | |
| 5,573,239 A * | 11/1996 | Ryker et al. | 473/436 |
| 5,823,894 A | 10/1998 | Actor | |
| 5,826,568 A * | 10/1998 | Van Ross, Jr. | 124/6 |
| 5,832,909 A * | 11/1998 | Grant et al. | 124/6 |
| 5,897,445 A * | 4/1999 | Sanders | 473/421 |
| 5,947,101 A | 9/1999 | Kerr | |
| 5,989,130 A | 11/1999 | Macaluso | |
| 6,016,858 A * | 1/2000 | Roesgen et al. | 152/209.1 |
| 6,026,798 A * | 2/2000 | Sanders et al. | 124/78 |
| 6,089,217 A | 7/2000 | Paulson et al. | |
| 6,093,117 A | 7/2000 | Sherlock et al. | |
| 6,102,021 A * | 8/2000 | Sanders et al. | 124/78 |
| 6,106,417 A | 8/2000 | Umlauft et al. | |
| 6,135,181 A * | 10/2000 | Paonessa et al. | 152/458 |
| 6,164,271 A * | 12/2000 | Paulson et al. | 124/78 |
| 6,186,134 B1 * | 2/2001 | Battersby et al. | 124/78 |
| 6,190,271 B1 | 2/2001 | Rappaport et al. | |
| 6,305,366 B1 * | 10/2001 | Rizzo et al. | 124/6 |
| 6,402,640 B1 | 6/2002 | Stuart | |
| 6,440,013 B1 | 8/2002 | Brown | |
| 6,443,140 B1 * | 9/2002 | Crews et al. | 124/78 |
| 6,443,141 B2 * | 9/2002 | Battersby | 124/78 |
| 6,470,873 B2 * | 10/2002 | Battersby et al. | 124/78 |
| 6,513,512 B2 * | 2/2003 | Battersby et al. | 124/78 |
| 6,546,924 B2 * | 4/2003 | Battersby et al. | 124/78 |
| 6,732,724 B1 * | 5/2004 | Paulson et al. | 124/6 |
| 6,739,325 B1 * | 5/2004 | Paulson | 124/78 |
| 6,880,542 B1 * | 4/2005 | Johndreau et al. | 124/78 |
| 6,895,949 B1 * | 5/2005 | Stephens | 124/6 |
| 7,011,084 B2 * | 3/2006 | Richard | 124/78 |
| 7,111,620 B2 | 9/2006 | Johndreau et al. | |
| 7,163,009 B2 | 1/2007 | Brown et al. | |
| 7,231,913 B2 | 6/2007 | Wilson | |
| 7,244,198 B2 | 7/2007 | Morshed et al. | |
| 7,278,934 B2 | 10/2007 | McBride et al. | |
| 7,383,832 B2 * | 6/2008 | Soberg | 124/6 |
| 7,691,012 B2 | 4/2010 | Cucjen et al. | |
| 7,900,618 B1 * | 3/2011 | Angermeier | 124/6 |
| 7,958,876 B2 * | 6/2011 | Lay | 124/6 |
| 8,342,162 B2 * | 1/2013 | Alger | 124/78 |
| 8,365,711 B2 * | 2/2013 | Kusiak et al. | 124/6 |
| 2002/0185120 A1 | 12/2002 | Scott | |
| 2003/0195061 A1 | 10/2003 | Brown | |
| 2005/0016516 A1 * | 1/2005 | Richard | 124/78 |
| 2006/0236993 A1 | 10/2006 | Cucjen et al. | |
| 2008/0185855 A1 | 8/2008 | Compton | |
| 2009/0095273 A1 * | 4/2009 | Paulson et al. | 124/78 |

OTHER PUBLICATIONS

International Search Report and Written Opinion mailed Dec. 17, 2012 from International Application No. PCT/US2012/039203.
International Preliminary Report on Patentability mailed Dec. 27, 2013 from International Application No. PCT/US2012/039203.
Office Action mailed Dec. 10, 2013 from Japanese Patent Application No. 2012-041855.
"Affidavit of Kenneth H. Ryker and photo exhibits," In the United States District Court for the District of Utah, Central Division, World Sports Products, Inc., dba *Trend Sports* v. *The Jugs Company, Jug, Inc.* v. *World Sports Products, Inc.*, dba Trend Sports and William Cole Lay, Case No. 2:08CV00173DB, Jan. 22, 2010, 13 pages.
Photos of the Bola Unit and another tire, 10 pages.

* cited by examiner

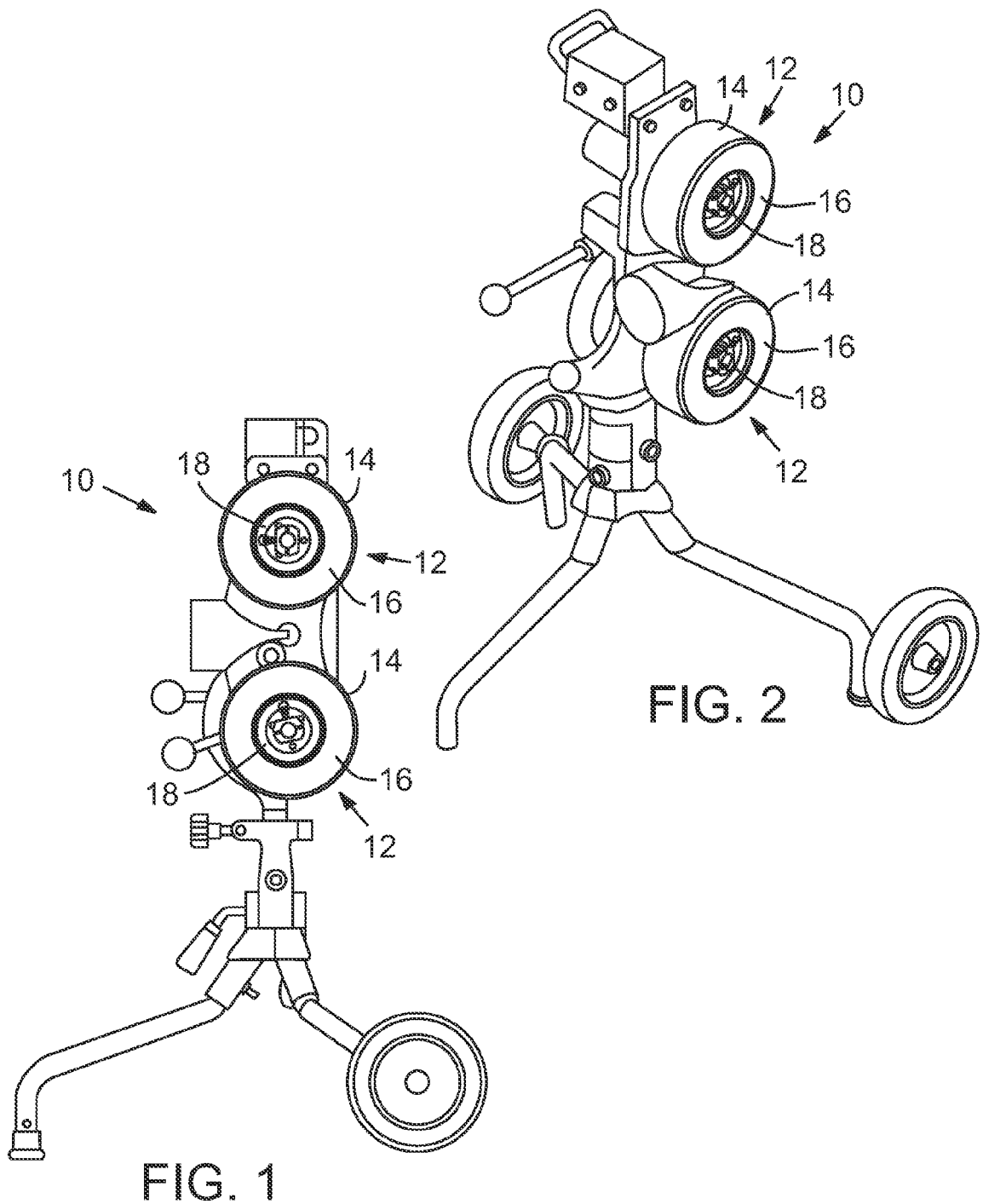

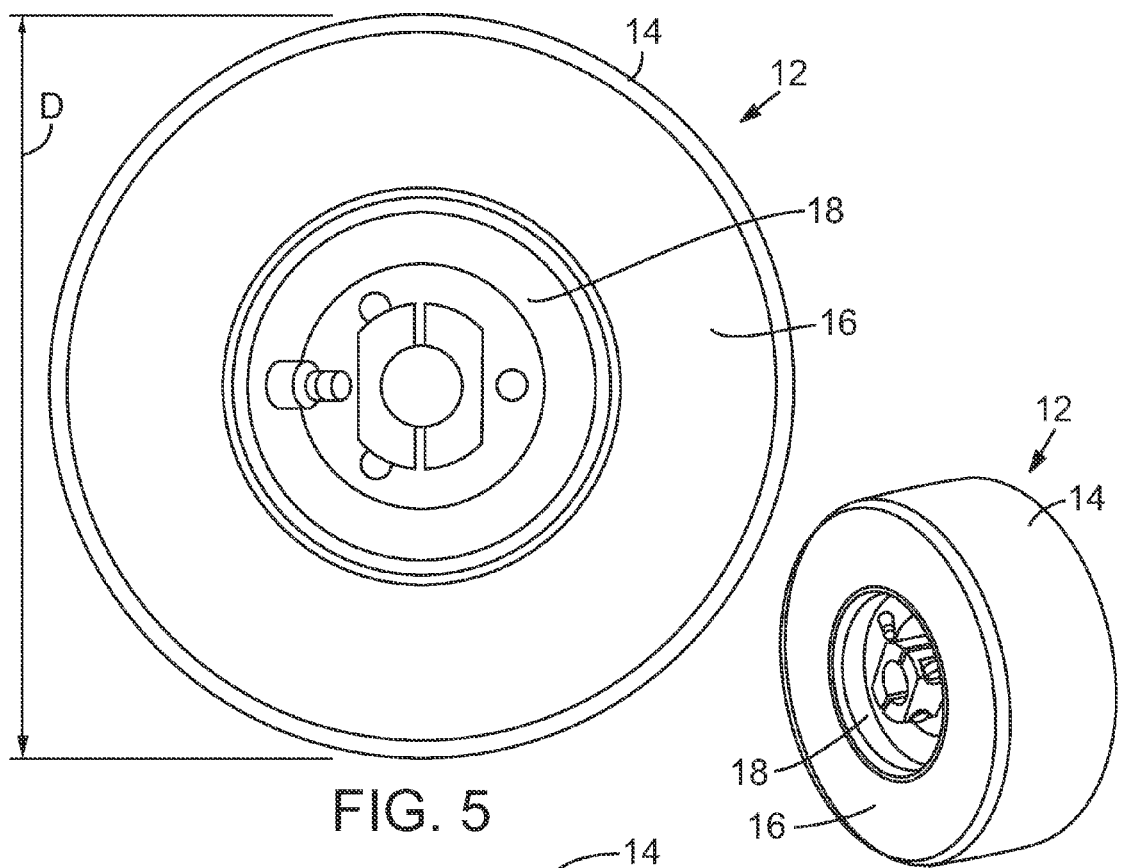
FIG. 5
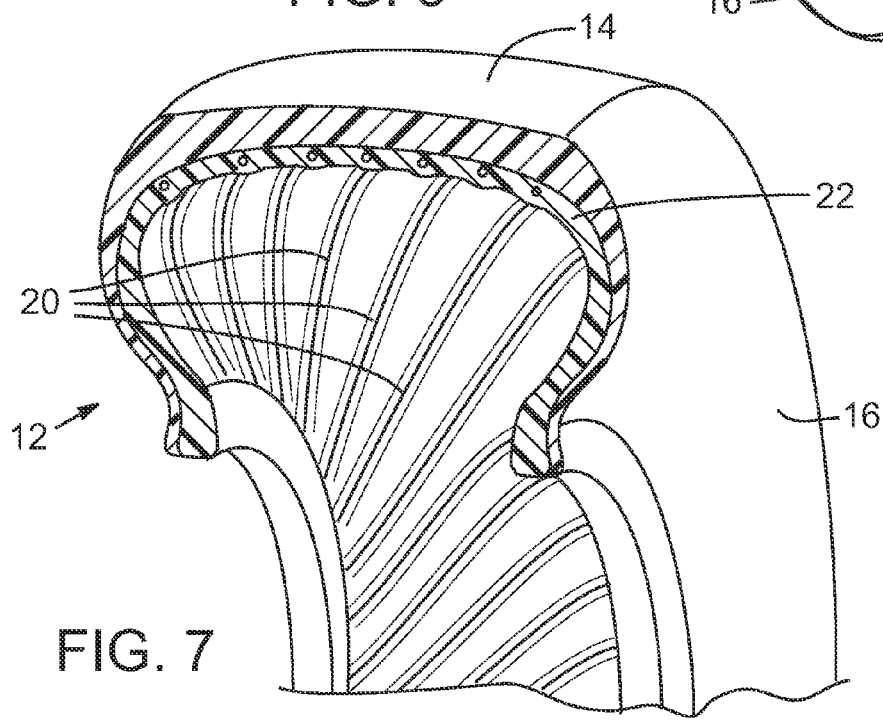
FIG. 6
FIG. 7

PNEUMATIC TIRE FOR THROWING MACHINE

FIELD

Embodiments of the present invention relate generally to tires for throwing machines.

BACKGROUND

Throwing machines, also referred to as "pitching machines," may be used to throw or project a ball or other object towards a user for various purposes, such as baseball or softball batting practice, or tennis practice. A throwing machine may include a tire that may be spun (e.g., with an electronic or gasoline motor) so that a ball brought into contact with the spinning tire is launched as a result of friction between the ball and a surface of the tire. In many instances the tire may include pitching surface with a high friction rate, so that a ball or other projectile brought into contact with the pitching surface will be carried with the pitching surface.

Many conventional throwing machine tires are made of solid rubber. Some tires are rounded, similar to tires that might be found on a bicycle, go-cart or motorcycle. Yet other tires are formed to be somewhat concave. A rounded tire may have a relatively small area of contact with a ball and may not have reinforced sidewalls. A relatively small area of contact with the ball afforded by a rounded tire may lead to less accurate, more inconsistent throws than a tire with a larger contact area.

BRIEF DESCRIPTION OF THE DRAWINGS

Embodiments are illustrated by way of example and not by way of limitation in the figures of the accompanying drawings, in which like references indicate similar elements.

FIG. 1 illustrates a pitching machine according to an embodiment of the disclosure.

FIG. 2 is an isometric view of the pitching machine of FIG. 1.

FIG. 5 is a view of a pneumatic tire according to an embodiment of the disclosure.

FIG. 6 is an isometric view of the pneumatic tire of FIG. 5.

FIG. 7 shows a pneumatic tire in cross section, according to an embodiment of the disclosure.

DETAILED DESCRIPTION

Figures 3, 4:
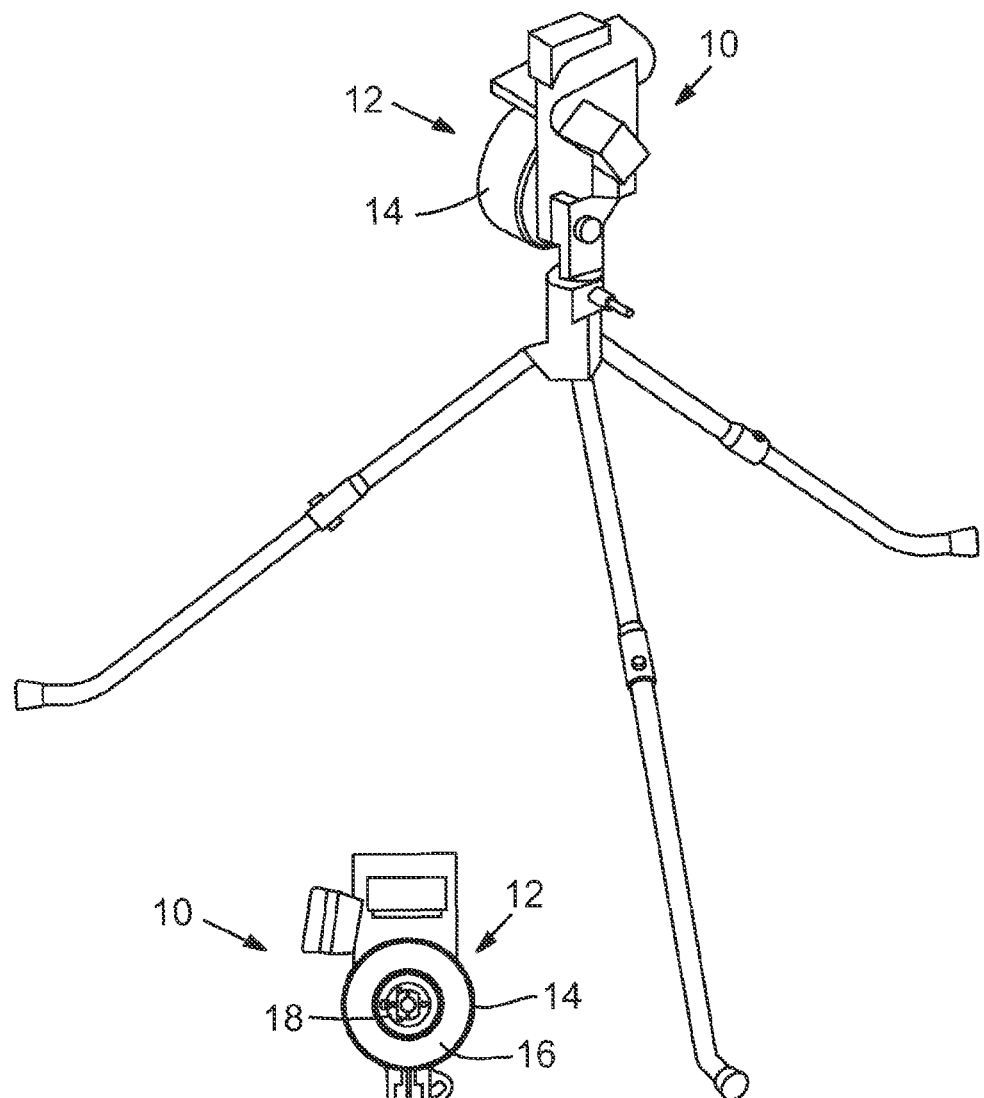
FIG. 3 illustrates a pitching machine according to another embodiment of the disclosure.
FIG. 4 is an isometric view of the pitching machine of FIG. 3.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific devices and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

In providing some clarifying context to language that may be used in connection with various embodiments, the phrases "A/B" and "A and/or B" mean (A), (B), or (A and B); and the phrase "A, B, and/or C" means (A), (B), (C), (A and B), (A and C), (B and C) or (A, B and C).

Referring now to FIGS. 1 and 2, an example of a ball pitching machine 10 is shown having two pneumatic tires 12. A ball pitching machine 10 may have more or less tires, as shown for example in FIGS. 3-4.

Ball pitching machine 10 is operated in some embodiments by causing pneumatic tires 12 to rotate in opposite directions, at the same speed or at different speed. A ball (not shown) such as a baseball or softball is positioned on one or more pitching surfaces 14 of the spinning pneumatic tires 12 so that friction between a surface of the ball and the one or more pitching surfaces 14 causes the ball to be launched in a direction tangent to a circumference of the pneumatic tires 12. In this embodiment, the ball is placed in between pneumatic tires 12 at a first end so that the rotation of pneumatic tires 12 draws ball in and launches it out an opposite end.

While the embodiment shown in FIGS. 1-2 has two pneumatic tires 12, other numbers of pneumatic tires are contemplated herein. For example, the ball pitching machine 10 in FIGS. 3-4 has a single pneumatic tire 12. Ball pitching machine 10 of FIGS. 3-4 may be operated similarly to ball pitching machine 10 of FIGS. 1-2. Pneumatic tire 12 may be spun using a spinning mechanism (not shown) such as an electric motor. A ball or other spherical object (not shown) may be placed on a pitching surface 14 of a spinning pneumatic tire 12 so that friction between the ball and pitching surface 14 causes the ball to be carried with pitching surface and subsequently launched from ball pitching machine 10.

Referring to FIG. 5, pneumatic tire 12 may have a diameter (indicated at "D") up to and including about 13 inches. In some embodiments, pneumatic tire 12 may have a diameter between about 9 inches and about 8 inches, or between about 8.25 inches and about 9.75 inches. In some embodiments, pneumatic tire 12 has a diameter of approximately 8.5 inches. In some embodiments, pneumatic tire 12 may have a diameter of about 6 inches. In some embodiments where multiple pneumatic tires 12 are used, each pneumatic tire 12 may have the same or substantially the same diameter. In other embodiments, each pneumatic tire 12 may have a different diameter.

Pneumatic tire 12 may have reinforced sidewalls 16 with pitching surface 14 in between. Pitching surface 14 may be similarly reinforced. Reinforcing pitching surface 14 and/or sidewalls 16 may prevent "doming" of pitching surface 14 when pneumatic tire 12 is spun at a high velocity by causing pitching surface 14 to be substantially flattened to receive a ball for launching. Reinforced pitching surface 14 and/or sidewalls 16 additionally or alternatively may allow pneumatic tire 12 to stay seated on a rim 18 even when pneumatic tire 12 is spun at high rotational velocities, including rotational velocities exceeding about 3,500 rotations per minute ("rpm").

Reinforced sidewalls 16 may be reinforced in various ways. In some embodiments wool windings 20 are interspersed in a layer of rubber in various patterns. For example, in FIG. 7 wool windings 20 are interspersed generally in a layer of rubber 22 a diagonal cross pattern. In some embodiments, increasing the severity of angles between the wool windings 20 and a direction of centrifugal forces on pneumatic tire 12 when it is spinning decreases how much pitching surface 14 will stretch or "dome." Wool windings 20 positioned at more severe angles may cause pitching surface 14 to remain in a relatively flat configuration for delivering consistent, accurate pitches.

Pneumatic tires 12 having diameters of up to and including about 13 inches may be spun at higher rotational velocities than larger tires. For example, in some embodiments, ball pitching machine 10 may include a spinning mechanism (not shown) such as an electric motor to spin one or more pneumatic tires 12 at greater than about 3,500 rpm. In some embodiments, the spinning mechanism may cause pneumatic tires 12 to spin at other velocities, including but not limited to greater than 4,000 or 4,200 rpm.

Pneumatic tires 12 as disclosed herein may be inflated to various pressures. For example, in some embodiments pneumatic tire 12 is inflated to about 20 pounds per square inch ("psi"). In some embodiments, inflating pneumatic tire 12 to significantly less than 20 psi may cause reinforced side wall 16 to not seat properly to rim 18. In some embodiments, inflating pneumatic tire 12 to a psi significantly higher than 20 psi may cause pneumatic tire 12 to be too firm to properly throw a ball.

Although the present invention has been described in terms of the above-illustrated embodiments, it will be appreciated by those of ordinary skill in the art that a wide variety of alternate and/or equivalent implementations calculated to achieve the same purposes may be substituted for the specific embodiments shown and described without departing from the scope of the present invention. Those with skill in the art will readily appreciate that the present invention may be implemented in a very wide variety of embodiments. This description is intended to be regarded as illustrative instead of restrictive on embodiments of the present invention.

What is claimed is:

1. A ball pitching machine, comprising:
a pneumatic tire having a diameter of less than about 13 inches, the pneumatic tire having reinforced sidewalls and a reinforced, substantially flattened pitching surface, wherein the sidewalls and pitching surface are reinforced by a reinforcing material that is interspersed with a base material of the pneumatic tire; and
a spinning mechanism to spin the pneumatic tire at greater than about 3,500 rotations per minute ("rpm").

2. The ball pitching machine of claim 1, wherein the spinning mechanism spins the pneumatic tire at greater than 4,200 rpm.

3. The ball pitching machine of claim 1, wherein the diameter is between about 9 inches and about 8 inches.

4. The ball pitching machine of claim 1, wherein the diameter is between about 8.25 inches and about 9.75 inches.

5. The ball pitching machine of claim 1, wherein the diameter is approximately 8.5 inches.

6. The ball pitching machine of claim 1, wherein the diameter is approximately 6 inches.

7. The ball pitching machine of claim 1, wherein the pneumatic tire is inflated to about 20 pounds per square inch ("psi").

8. The ball pitching machine of claim 1, wherein the reinforced sidewalls cause the pitching surface to be substantially flattened and prevent the pitching surface from doming when the pneumatic tire is spun at greater than about 3,500 rpm.

9. A pneumatic tire for a pitching machine, the pneumatic tire comprising:
a diameter between about 13 inches and about 6 inches;
a base material; and
a reinforcing material disposed in the base material to provide the pneumatic tire with reinforced sidewalls and a reinforced, substantially flat pitching surface.

10. The pneumatic tire of claim 9, wherein the diameter is between about 9 inches and about 8 inches.

11. The pneumatic tire of claim 9, wherein the diameter is between about 8.25 inches and about 9.75 inches.

12. The pneumatic tire of claim 9, wherein the diameter is approximately 8.5 inches.

13. The pneumatic tire of claim 9, wherein the diameter is approximately 6 inches.

14. The pneumatic tire of claim 9, wherein the pneumatic tire is inflated to about 20 pounds per square inch ("psi").

15. The pneumatic tire of claim 9, wherein the reinforced sidewalls prevent the pitching surface from doming when the pneumatic tire is spun at greater than about 3,500 rpm.

16. The ball pitching machine of claim 1, wherein the reinforcing material is interspersed in the base material in a diagonal cross pattern.

17. The pneumatic tire of claim 9, wherein the reinforcing material is disposed in the base material in a diagonal cross pattern.

* * * * *